May 12, 1953  G. D. ALVORD  2,638,248
CONTINUOUS BATCH FEEDER CONTROL
Filed Jan. 3, 1947  4 Sheets-Sheet 1
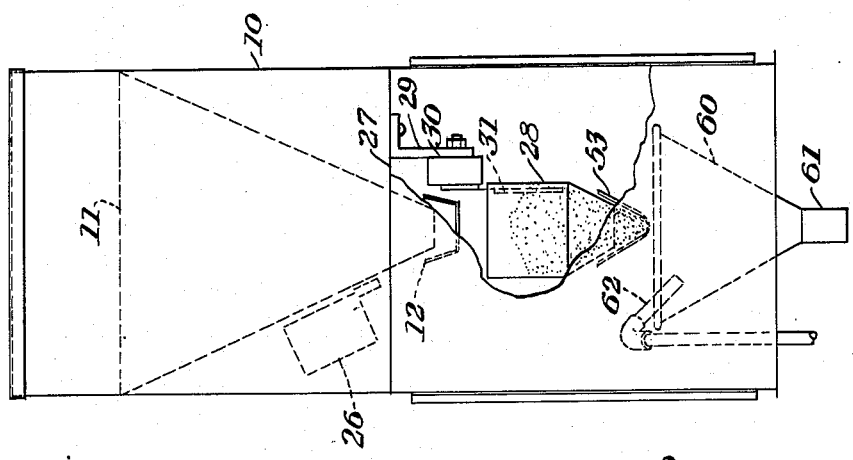
Fig. 2.
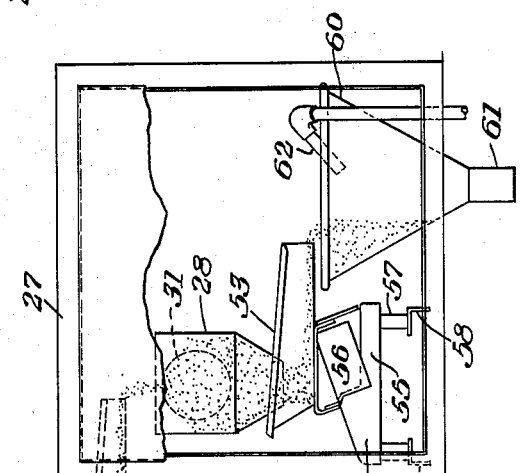
Fig. 1.
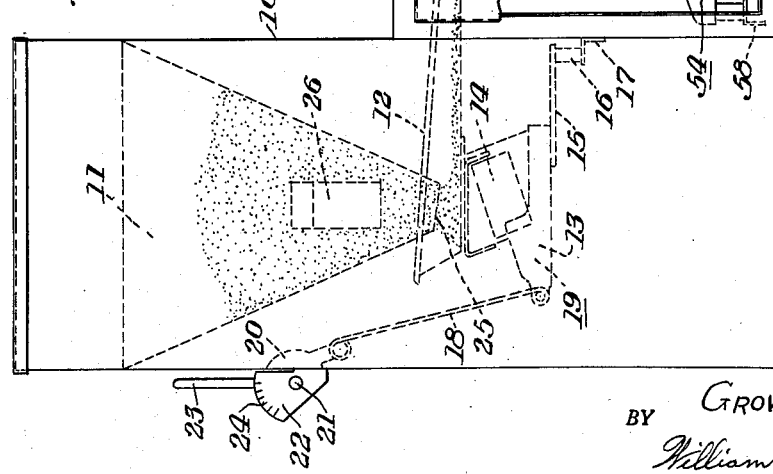
INVENTOR.
GROVE D. ALVORD
BY William D. Carothers
his Atty.

May 12, 1953  G. D. ALVORD  2,638,248
CONTINUOUS BATCH FEEDER CONTROL
Filed Jan. 3, 1947  4 Sheets-Sheet 2
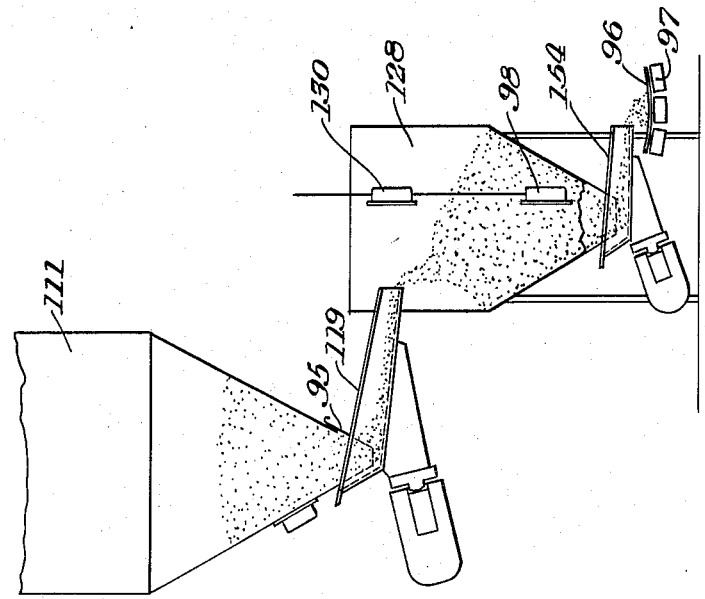
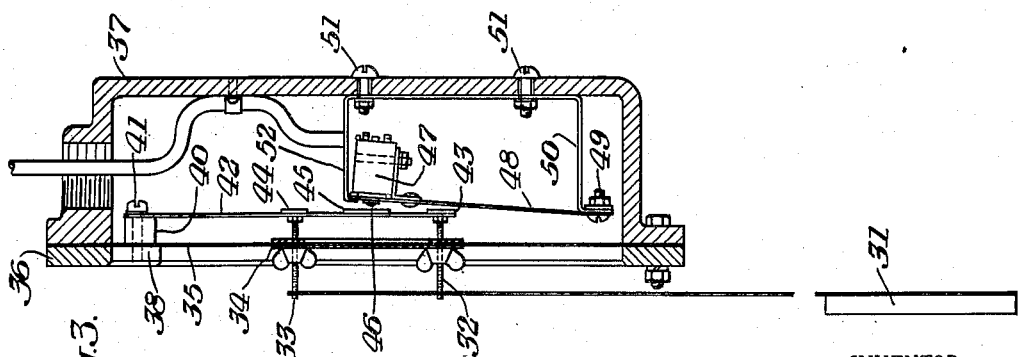
INVENTOR.
GROVE D. ALVORD
BY
William D. Carothers
his atty.

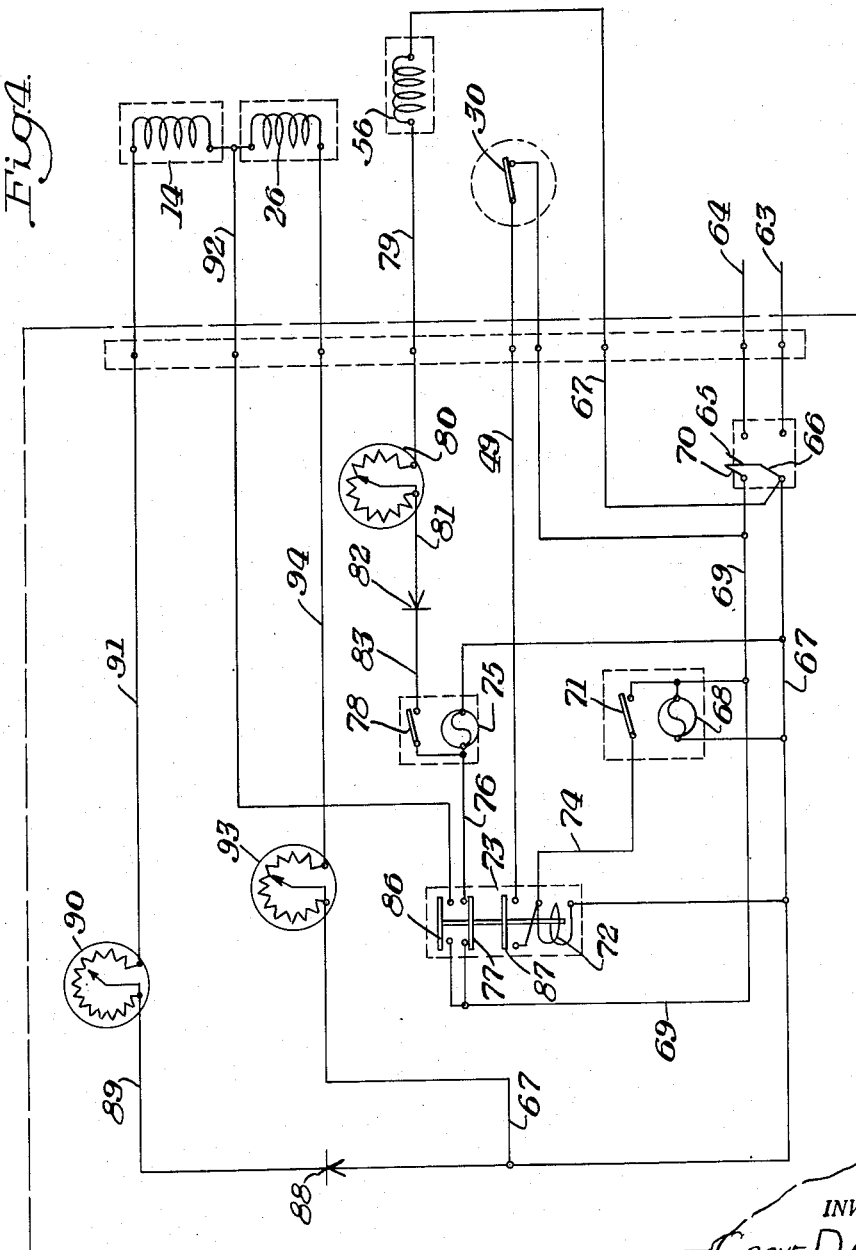

Patented May 12, 1953

2,638,248

UNITED STATES PATENT OFFICE 2,638,248

CONTINUOUS BATCH FEEDER CONTROL

Grove D. Alvord, Indiana, Pa., assignor to Syntron Company, Homer City, Pa., a corporation of Delaware Application January 3, 1947, Serial No. 720,043

8 Claims. (Cl. 222—56)

This invention relates generally to method and apparatus for material feeding machines and more particularly to the method and apparatus of a continuous batch feeder control for regulating the flow of material that is delivered from the feeder conveyor.

This invention is particularly advantageous for use in controlling vibratory feeder conveyors.

The principal object of this invention is the method and apparatus providing an accurate control of the volume of the material delivered by a feeder machine.

Another object of this invention is the provision of a feeder machine arranged to supply an accurate volume of material over a predetermined period of time.

Another object is the provision of a feeder machine arranged to accurately deliver equal volumes of material over similar periods of time.

Another object is the provision of a vibratory feeder machine having a relatively high volumetric accuracy.

Other objects and advantages appear hereinafter in the following description and claims.

A practical embodiment illustrating the principles of this invention is shown in the accompanying drawings wherein:

Figure 1 is a view in side elevation with parts broken away illustrating the volumetric feeder machine comprising this invention;

Fig. 2 is a view in end elevation of the structure shown in Fig. 1;

Fig. 3 is a sectional view of the hopper level switch;

Fig. 4 is a diagram showing the control circuit of the volumetric feeder.

Fig. 5 is a schematic diagram illustrating a batch hopper and feeder arranged to deliver material to a belt conveyor.

Figure 6:
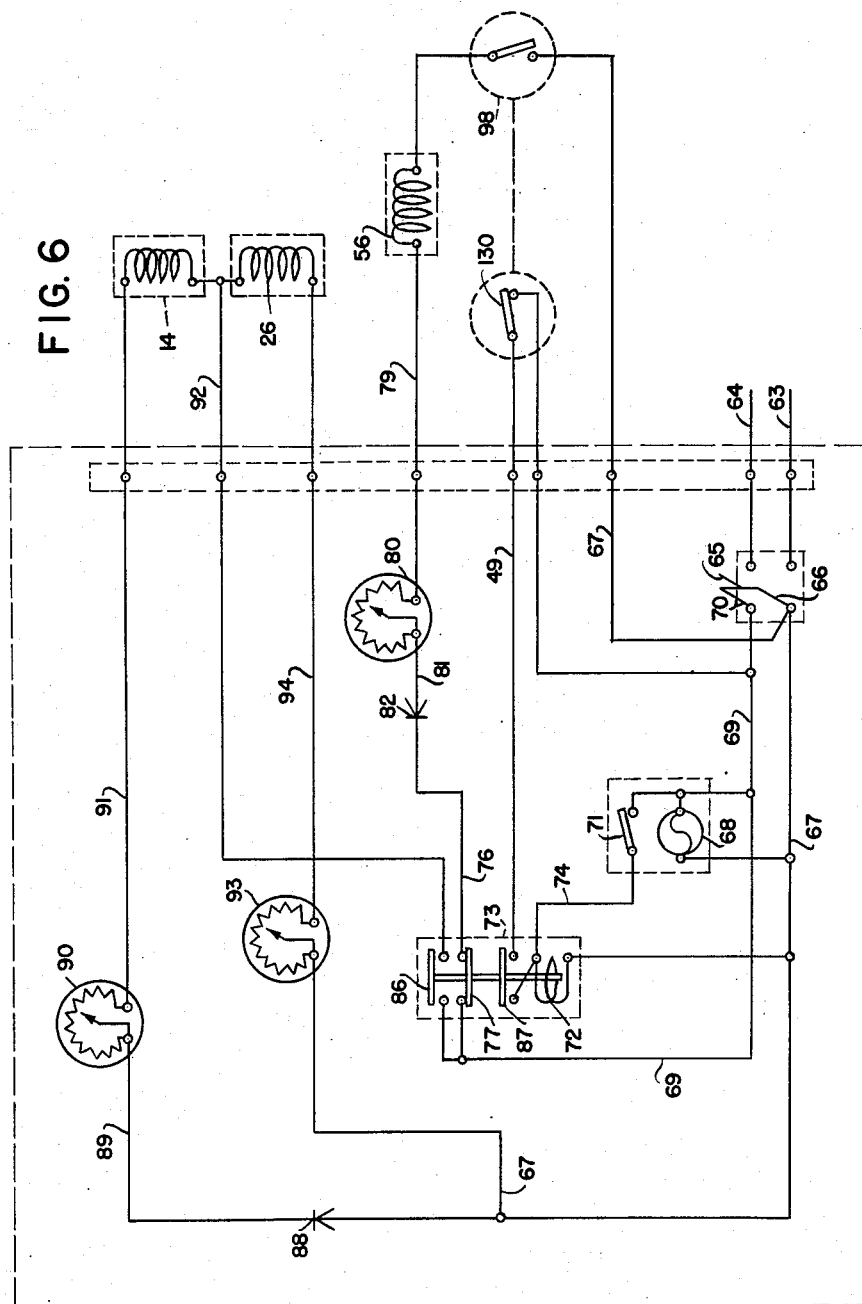
Fig. 6 is a diagram showing a modified control circuit of the volumetric feeder.

Referring to Figs. 1 and 2 of the drawings, 10 represents an enclosed frame in which the supply hopper 11 is mounted. The discharge mouth of this hopper is arranged to direct material therefrom into the trough 12 of the supply feeder 19 mounted for vibration on the base 13 and operated by the vibratory motor 14. The base 13 is secured to the platform 15, one end of which is pivotally supported on the resilient member 16 carried on the angle bracket 17 which is mounted on the frame 10. The other end of the base member 13 is pivotally attached to the lower end of the link 18, the upper end of which is pivotally secured to the sector 20 secured to the shaft 21 which is journaled in the plate 22. The operating handle 23 is secured to the sector 20 and is arranged to be locked in various positions to the plate 22 as indicated at 24. By rotating the handle 23 the base 13 of the feeder may be raised or lowered to any desired position to control the volumetric flow of the material from the supply hopper 11 to the supply feeder conveyor trough 12.

The mouth 25 of the supply hopper 11 is disposed at an angle to the horizontal and when the operating handle 23 is moved to raise the vibratory feeder the floor of the trough 12 may be positioned parallel with and closely adjacent to the mouth 25 of the hopper. When the feeder is raised to substantially close the mouth of the hopper, material ceases to flow from the hopper and by adjusting the handle 23 so as to position the floor of the conveyor 12 a predetermined distance from the mouth of the hopper, complete control of the feed of the material from the hopper may be obtained.

A vibrator 26 is mounted on the side of the hopper for the purpose of vibrating the same to deaerate the material and provide a positive uniform flow of the material from the hopper 11.

A frame 27 is mounted adjacent the frame 10 and is provided with a batch hopper 28 arranged to receive the material discharged from the feeder trough 12. The batch hopper 28 is comparatively small in volume to that of the supply hopper 11. A normally closed hopper level switch 30 is supported above and to one side of the batch hopper 28 and is provided with a depending actuating paddle member 31 that extends down into the hopper 28 adjacent one side thereof so as to be engaged by the material fed to the batch hopper 28. The actuating paddle 31 is employed in this instance because the batch hopper 28 is not sufficiently large to contain the level switch 30.

As shown in Fig. 3 the upper end of the paddle 31 is secured to the bolts 32 and 33 of the level switch 30, which pass through the rigid disk member 34 mounted in the center of the diaphram 35. The perimeter of the diaphragm is clamped in position between the clamping ring 36 and the case 37. The clamping ring 36 is provided with an inwardly extending lug 38 for the purpose of carrying the spacer post members 40 which are secured on the inside of the diaphragm 35 by means of the bolts 41 which pass through the diaphragm and are fastened to the lug 38. The bolts 41 are arranged to support the inner end of the leaf spring 42, the outer end of which is secured to the bolts 32 and 33 as indicated at 43 and 44. Intermediate of the bolts 32 and 33 the leaf spring 42 is arranged to carry the mechanical contact plate member 45 which will engage and depress the switch pin 46 mounted in the switch member 47 and open an electrical contact when pressure is exerted on the diaphragm, causing the leaf spring 42 to flex. The switch member 47 is supported on the free end of the leaf spring 48 the other end of which is secured by the bolt 49 to the bracket member 50 which in turn is fastened to the back of the case 37 by the bolts 51. The upper end of the bracket 50 is provided with an outwardly and downwardly extending arm 52 arranged to engage the free end of the leaf spring 48 to limit the extent of the outward position of the switch 47. The switch 47 may be constructed to either open or close an electrical circuit or in some instances performs both functions.

In operation when the paddle 31 is moved to the right in Fig. 3 the diaphragm 35 becomes flexed, causing the plate 45 to engage and depress the switch pin 46 and operate the switch. Further movement of the paddle 31 to the right merely flexes the leaf spring 48 and moves the switch 47 inwardly until the plate 45 engages the stop 52 of the bracket 50.

The hopper level switch 30 may be adjusted vertically along the bracket 29 as shown in Fig. 2 to raise or lower the paddle 31 within the batch hopper 28 and thereby provide different selected volumes of material to be handled by the same apparatus.

The batch hopper 28 is arranged to discharge material into the feeder trough 53 of the distribution feeder 54. The feeder trough 53 is supported for vibration on the base 55 and is operated by the vibratory motor 56. The base 55 of the distribution feeder 54 is supported on the resilient feet 57 which in turn are mounted on brackets 58 carried by the frame 27.

The conveyor trough 53 of the distribution feeder 54 is arranged to feed material for any desired purpose. However as shown in the drawings a vortex type solution pot 60 is arranged to receive the material from the feeder 54 which is re-discharged from the lower end thereof to the delivery pipe 61. A nozzle 62 is arranged to supply a stream of liquid to the pot 60, the stream issuing therefrom being directed downwardly against the side of the pot to provide a swirling action, the liquid becoming thoroughly mixed with and carrying the material fed from the distribution feeder 54 to form a solution that is discharged through the pipe 61.

Referring to the wiring diagram in Fig. 4, 63 and 64 represent a suitable source of alternating electric current supply for operating the motor 14 of the feeder 19, the vibrator 26 and the motor 56 of the distribution feeder 54. When the line switch 65 is closed current flows from the supply line 63 through the switch blade 66, the line 67 to the timer 68 and returns through the line 69, the switch blade 70 to the return circuit line 64. When the timer 68 is thus energized after a predetermined time it will close its contact 71, causing the current to flow from the line 67 through the coil 72 of the relay 73 and return through the line 74, switch 71, the line 69, switch blade 70 and to the return circuit line 64. After the timer 68 closes its contact 71 to energize the relay 73 the contact 71 again opens the circuit but the relay 73 remains energized through a circuit maintained by the switch 30 which forms a stick or holding circuit for the relay 73 through the line 49. With line switch 65 closed current flows through the line 67 to the timer 75, the line 76, the normally closed contact 77 of the relay 73, the line 69 and the switch blade 70 and return circuit line 64.

Let is be assumed that the timer 68 is a fifteen minute timer and the timer 75 is a one minute timer. Thus the latter timer will function to close its switch 78 before the former timer closes its switch 71. Upon the closing of the switch 78 current flows from the line 63 through the switch blade 66, the line 67 through the motor 56 of the distribution feeder 54 and thence through the line 79, the rheostat 80, the line 81, rectifier 82, line 83, the timer switch 78, the line 76, the normally closed contact 77, relay 73, the line 69, switch blade 70 to the return circuit line 64. Upon energizing the distribution feeder 54 the latter will operate commencing the discharge of the material from the batch hopper 28 to the pot 60.

The distribution feeder 54 will continue to discharge portions of the material from the batch hopper 28 at one minute intervals until the fifteen minute timer 68 closes its contact 71 to open the normally closed contact 77 upon energizing relay 73. The distribution feeder 54 is adjusted to convey the material from the batch hopper 28 at such a rate as to completely empty the batch hopper 28 at a short interval of time before the completion of the fifteen minute cycle of the timer 68. If the distribution feeder is not set to completely empty the batch hopper within the selected time cycle of the timer 68 the material supplied will not conform to the predetermined amount of material required.

The distribution feeder 54 will continue to operate until after the passage of a predetermined setting of the timer 68, which in this instance would be fifteen minutes. When the timer 68 functions to close the switch 71 and energize the relay 73 the circuit of the distribution feeder 54 is opened by the contact 77 of the relay 73 and the contacts 86 and 87 are closed. The distribution feeder thus ceases to operate, and upon the closing of the contacts 86 and 87 current flows from the line 63 to the switch blade 66, the line 67, the rectifier 88, the line 89, the rheostat 90, and line 91 to the motor 14 of the supply feeder 19 and returns through the line 92, contact 86 of relay 73, line 69, switch blade 70 to the return circuit line 64, thus energizing the motor 14 of the supply feeder 19 and cause the material to flow from the supply hopper 11 along the feeder trough 12 into the batch hopper 28. This batch feed ordinarily requires a relatively short period of time. At the same time the current flows from the line 67 through the rheostat 93, the line 94 to the coil of the vibrator 26 and returns to the line 92, the relay contact 86 and line 69 to operate the vibrator 26 and maintain uniform flow conditions of the material when discharging from the supply hopper 11.

As the supply feeder 19 continues to deliver material to the hopper 28, the material piles up on the conveyor floor of the distribution feeder 54, which checks any further flow out the batch hopper 28 onto the trough 53, causing the batch hopper to fill until the volume of the material creates a sufficient pressure to move the paddle 31 to the right and actuate the level switch 30 to open the circuit of the motor 14.

Thus the hopper switch 30 will function to de-energize the coil 72 of the relay 73 when the batch hopper 28 contains the selected predetermined volume of the material. Upon de-energizing the relay 73 the contacts 86 and 87 open to interrupt the circuits of the motor 14 and the hopper vibrator 26.

When the relay 73 becomes de-energized it closes its contact 77, thereby again energizing the timer 75 which functions to produce periodic impulses energizing the motor 56 of the distribution feeder 54 to discharge the material from the batch hopper 28 to the pot 60 as previously described. The operation of the distribution feeder 54 is preferably set to feed the material from the batch hopper 28 over a series of short periods of time, whereas the supply feeder 19 is arranged to supply the batch hopper 28 in a relatively short period of time. Thus both feeders function alternately during a predetermined cycle to intermittently feed the material to the pot 60.

The feeding machine illustrated in Fig. 5 is the same as that shown in Fig. 1 but arranged to handle a greater amount of material and the batch hopper 128 is materially larger than the batch hopper 28. The supply hopper 111 is provided with the gate valve 95 in place of adjusting the relative position of the supply feeder 119. The distribution feeder 154 feeds the material from the hopper 128 to the belt conveyor 96, the upper flight of which is supported on the rollers 97.

When using large batch hoppers the level switch 130 may be positioned within the batch hopper 128, thereby dispensing with the paddle. This switch is arranged to be moved to different elevations within the batch hopper to enable the deposit of different selected volumes of material to be handled by the same apparatus in the same manner as that shown in regard to the switch 30 in Fig. 2.

If the material to be handled is of the character that readily flushes it, is desirable to retain a sufficient residue of the material in the bottom of the batch hopper as indicated in Fig. 6. The amount of residue is sufficient to close the bottom of the hopper and when the material is added thereto it will not flush out over the distributing conveyor trough 53. The residue of material or heel is maintained by employing the second level switch 98 adjustably supported from the switch 130. The switch 98 is a normally open switch similar to the switches 30 and 130 and is maintained in its closed position by the pressure of the material acting on its diaphragm. When the material is drained away from the diaphragm of the switch 98 it is arranged to open the circuit of the distribution feeder motor and may be placed in the circuit of Fig. 4 on either side of this motor. Thus by the operation of the limit level switches 98 and 130 equal volumes of material may be repeatedly fed from the batch hopper.

If it is desired to operate the distribution feed of either machine so as to quickly empty the batch hopper in place of feeding the separate batches of material in spaced intervals of time within the limits of the period of the timer 68, the timer 75 may be shunted out of the circuit by connecting the adjacent ends of the lines 76 and 83 as illustrated in Fig. 6. With this arrangement the distribution feeder will continuously operate to discharge the batch within the batch hopper and when the cycle of the timer 68 has been completed the relay 72 is again energized and the supply feeder operates to fill the batch hopper until the upper lever switch is engaged by a sufficient amount of the material to function and open the circuit of the relay 72. When the relay 72 becomes de-energized the distribution feeder becomes energized to remove and convey the material from the batch hopper until the level of the material therein is no longer effective on the switch 98, which then opens the circuit of the distribution feeder motor and the apparatus then lies dormant until the completion of the next cycle of operation of the timer 68. A very accurate volumetric feed of material is produced by this apparatus for the periods of operation of the timer 68.

I claim:

1. In a granular material feeding apparatus, the combination of a feeder conveyor positioned to deliver the material to be fed, a batch hopper for supplying the feeder conveyor and the discharge of which is controlled by the latter, a supply conveyor positioned to deliver the material to the batch hopper, and means responsive to the volume of material in the batch hopper and including a timer for consecutively controlling the operation of both conveyors alternately.

2. In a granular material feeding apparatus, the combination of a feeder conveyor positioned to deliver the material to be fed, a batch hopper for supplying the material to the feeder conveyor and the discharge of which is controlled by the latter, a supply conveyor positioned to deliver the material to the batch hopper, and means within the batch hopper responsive to predetermined limits of volume in the batch hopper and including a timer for consecutively controlling the starting of the feeder conveyor to deliver a predetermined amount of material and to stop the feeder conveyor and operate the supply conveyor to replenish the material fed therefrom.

3. In a granular material feeding apparatus, the combination of a feeder conveyor positioned to deliver material to be fed, a hopper for supplying the material to the feeder conveyor and the discharge of which is controlled by the latter, a supply conveyor positioned to deliver material to the hopper, timer means for repeatedly initiating the operation of the supply conveyor, and means responsive to a predetermined volume in the hopper for alternately and consecutively stopping the supply conveyor and for starting the feeder conveyor to deliver the predetermined volume of material.

4. A volumetric feeding apparatus for granular material comprising an electrically operated supply conveyor, a batch hopper positioned to receive material from the supply conveyor, an electrically operated feeder conveyor positioned to receive material from the batch hopper and deliver the same, a relay having normally closed and normally open contacts when deenergized, a circuit to supply electrical energy through the normally open contacts to operate the supply conveyor, a circuit to supply electrical energy through the normally closed contacts to operate the feeder conveyor, a timer having contacts connected in a circuit to energize said relay, and switch means responsive to a volume of material in the batch hopper and connected in the relay energizing circuit to deenergize said relay in response to a predetermined quantity of material delivered to said batch hopper.

5. A volumetric feeding apparatus for granular material comprising an electrically operated supply conveyor, a batch hopper positioned to receive material from the supply conveyor, an electrically operated feeder conveyor positioned to receive material from the batch hopper and deliver the same, a relay having normally closed and normally open contacts when deenergized, a circuit to supply electrical energy through the normally open contacts to operate the supply conveyor, a circuit to supply electrical energy through the normally closed contacts to operate the feeder conveyor, a timer having contacts connected in a circuit to energize said relay, switch means responsive to a volume of material in the batch hopper and connected in the relay energizing circuit to deenergize said relay in response to a predetermined volume of material delivered to said batch hopper, and a second timer having contacts connected in the feeder circuit to periodically interrupt the operation of said feeder in periods shorter than the periods of the first timer.

6. A volumetric feeding apparatus for granular material comprising an electrically operated supply conveyor, a bath hopper positioned to receive material from the supply conveyor, an electrically operated feeder conveyor positioned to receive material from the batch hopper and deliver the same, a relay having normally closed and normally open contacts when deenergized, a circuit to supply electrical energy through the normally open contacts to operate the supply conveyor, a circuit to supply electrical energy through the normally closed contacts to operate the feeder conveyor, a timer having contacts connected in a circuit to energize said relay, switch means responsive to a maximum volume of material in the batch hopper and connected in the relay energizing circuit to deenergize said relay in response to a predetermined volume of material delivered to said batch hopper, and second switch means responsive to a minimum volume of material in the batch hopper and connected in the circuit of said feeder conveyor to deenergize said feeder conveyor in response to a predetermined minimum volume of material remaining in said batch hopper.

7. A volumetric feeding apparatus for granular material comprising an electrically operated supply conveyor, a batch hopper positioned to receive material from the supply conveyor, an electrically operated feeder conveyor positioned to receive material from the batch hopper and deliver the same, a circuit energizing and deenergizing means responsive to a maximum volume of material in the batch hopper to deenergize the supply conveyor and to energize the feeder conveyor to discharge the batch hopper, and a second circuit energizing and deenergizing means responsive to a minimum volume in the batch hopper to deenergize the feeder conveyor and energize the supply conveyor to replenish the maximum volume of material in the batch hopper.

8. A volumetric feeding apparatus for granular material comprising an electrically operated supply conveyor, a batch hopper positioned to receive material from the supply conveyor, an electrically operated feeder conveyor positioned to receive material from the batch hopper and deliver the same, a circuit energizing and deenergizing means responsive to a maximum volume of material in the batch hopper to deenergize the supply conveyor and to energize the feeder conveyor, and a circuit timing means to reenergize the supply conveyor and deenergize the feeder conveyor after the lapse of a predetermined period of time sufficient for the feeder conveyor to empty the batch hopper.

GROVE D. ALVORD.

References Cited in the file of this patent

UNITED STATES PATENTS

| Number | Name | Date |
|---|---|---|
| 308,001 | Sommer | Nov. 11, 1884 |
| 925,390 | Royer | June 15, 1909 |
| 1,372,768 | Mott | Mar. 29, 1921 |
| 1,610,564 | McLaughlin | Dec. 14, 1926 |
| 2,101,257 | Vogel-Jorgensen | Dec. 7, 1937 |
| 2,125,898 | Dykstra | Aug. 9, 1938 |
| 2,276,382 | Francis | Mar. 17, 1942 |
| 2,340,030 | Weyandt | Jan. 25, 1944 |
| 2,381,505 | Lindholm | Aug. 7, 1945 |

FOREIGN PATENTS

| Number | Country | Date |
|---|---|---|
| 856,871 | France | Aug. 13, 1946 |
| 487,099 | Great Britain | June 15, 1933 |
| 661,667 | Germany | June 23, 1938 |